(12) United States Patent
Niewels

(10) Patent No.: US 7,037,103 B2
(45) Date of Patent: May 2, 2006

(54) APPARATUS FOR INJECTION MOLDED ARTICLES

(75) Inventor: Joachim Johannes Niewels, Thornton (CA)

(73) Assignee: Husky Injection Molding Systems, Ltd., Bolton (CA)

( * ) Notice: Subject to any disclaimer, the term of this patent is extended or adjusted under 35 U.S.C. 154(b) by 236 days.

(21) Appl. No.: 10/670,870

(22) Filed: Sep. 25, 2003

(65) Prior Publication Data

US 2004/0058031 A1 Mar. 25, 2004

Related U.S. Application Data

(63) Continuation-in-part of application No. 09/900,083, filed on Jul. 6, 2001, now abandoned.

(51) Int. Cl.
*B29C 45/23* (2006.01)

(52) U.S. Cl. .................................. 425/564; 264/328.9
(58) Field of Classification Search ............... 425/562, 425/563, 564, 565, 566; 264/328.9
See application file for complete search history.

(56) References Cited

U.S. PATENT DOCUMENTS

| | | | |
|---|---|---|---|
| 4,256,584 A | 3/1981 | Lord et al. | |
| 4,286,941 A | 9/1981 | Gellert | |
| 4,712,995 A | 12/1987 | Bansnett | |
| 5,254,305 A | 10/1993 | Fernandez et al. | |
| 5,695,793 A * | 12/1997 | Bauer | 425/564 |
| 5,902,614 A | 5/1999 | Kuntz | |
| 6,135,757 A * | 10/2000 | Jenko | 425/562 |
| 6,214,275 B1 * | 4/2001 | Catoen et al. | 264/328.9 |
| 6,290,891 B1 | 9/2001 | Galt | |
| 6,318,990 B1 * | 11/2001 | Gellert et al. | 425/549 |

FOREIGN PATENT DOCUMENTS

EP 0638407 B1 8/1994

OTHER PUBLICATIONS

Gate Detail, from Husky gate insert (Part S01EJ176, Dated Jul. 18, 1991) sold circa 1991.

* cited by examiner

*Primary Examiner*—Tim Heitbrink

(57) ABSTRACT

An improved injection molding apparatus for a mold using a valve-gated nozzle that includes a replaceable insert with a bore for aligning and sealing with the valve stem. The replaceable insert is advantageously provided as a wear component in a gate insert.

23 Claims, 7 Drawing Sheets

APPARATUS FOR INJECTION MOLDED ARTICLES

This application is a continuation-in-part of an application entitled "Method and Apparatus for Injection Molding Articles", application Ser. No. 09/900,083 filed Jul. 6, 2001, now abandoned, and is incorporated herein by reference.

BACKGROUND OF THE INVENTION

1. Field of the Invention

This invention relates to injection molding systems.

More specifically, the present invention relates to a valve gating system found in injection molding systems.

2. Summary of the Prior Art

Injection molding nozzles are well known and are used to inject materials, such as plastic, into cavities of a mold. For example, such nozzles receive molten material, such as plastic, from an injection molding machine and direct the same into mold cavities through passages called gates. When an injection operation is complete, and prior to opening the mold cavity to eject the molded parts, the transfer of molten material through the gates must be stopped. Generally, two methods exist for stopping the transfer of molten material through the gates, namely: thermal, or open, gating; and valve gating.

In thermal gating, the gate is an open aperture through which molten material passes during an injection operation. The gate is rapidly cooled at the end of the injection portion of the cycle, when the injection pressure is removed, to "freeze" the injected material into a plug. This plug remains in the gate to prevent drool of molten material from the gate when the mold is open for the ejection of the molded part. In the next injection portion of the cycle, the cooling applied to the gate is effectively removed and hot molten material from the injection molding machine pushes the remaining plug into the mold cavity, where it melts and mixes with the newly provided molten material.

In valve gating, the opening and closing of the gate is independent of injection pressure and/or cooling and is achieved mechanically with a valve stem. This stem can be moved between an open position, wherein flow of molten materials through the gate is permitted, and a closed position wherein the gate is closed by entry of the valve stem into the gate which establishes a seal, preventing molten materials from passing through the gate. Valve gating is well known and examples of such systems are shown in U.S. Pat. Nos. 2,878,515; 3,023,458; and 3,530,539, each being incorporated herein by reference.

Generally, for situations that require improved aesthetics, valve gating is preferable to thermal gating because it can reduce the undesired gate vestige which results on the finished molded part. However, there are problems with valve gating systems.

Specifically, the valve stem and gate each have mating sealing portions with a typical diametrical clearance of 0.001 to 0.002 inch between the valve stem and the gate sealing portions. As the valve stem is moved into alignment with the sealing portion of the gate to effect sealing, a slight misalignment of the stem with the gate will cause the stem to strike the gate sealing portion. Over time, this will cause the gate area to wear and become misshapen. Once the gate sealing area is worn, the stem no longer stops the flow of molten material and a small amount of molten material will migrate between the stem and the worn gate sealing area. This leakage adversely impacts the vestige quality because as the mold is opened, the now-solidified material between the gate and the valve stem will cause a tear or blemish to form along the vestige of the part, and in extreme cases, the tearing can propagate to the surface of the molded article or preform.

Following the injection cycle, typically the mold halves will open and the molded article in a somewhat solidified state will be removed from the stem/gate area. Due to the entrapped molten material between the worn gate area and the stem, the molded article will not break away cleanly when the mold is opened, but rather will tear away from the gate area, which results in a blemished vestige on the molded article.

Referring to FIGS. 1 and 2 this phenomenon can be related. As well known in the art, a nozzle assembly 10 is comprised of an elongated nozzle bushing 12 with a nozzle tip 16 affixed co-axially therein. Optionally, an insulator 14 is affixed to a proximal end of the nozzle tip 16 thereby thermally insulating the heated nozzle assembly 10 from a cooled gate insert 31 and cavity insert 34. A movable valve stem 18 extends co-axially in the nozzle assembly 10 and is selectably positioned in or out of a passageway 22 in the nozzle. A melt channel 20 surrounds the valve stem 18 and runs the length of the nozzle assembly 10 to communicate a molten material to a mold cavity 28. When the valve stem 18 is placed in a fully closed position (as shown in FIG. 1), valve stem 18 extends into a gate sealing portion 25 in the gate insert 31. The sealing portion 25 sealingly surrounds the valve stem 18 to shut off the flow of material to the mold cavity 28. As shown in FIG. 1, a face portion 21 of valve stem 18 and a gate vestige forming portion 35 of the gate insert 31 define the entire top and side of the molded article vestige 26. A chamfer 36 is typically provided along the face of the valve stem 18 to help guide the valve stem into the sealing portion 25 of gate insert 31 and reduce wear of the valve stem and gate inset 31.

Due to the close fit of the valve stem 18 to the sealing portion 25, any misalignment that exists between their respective interfaces will cause the valve stem 18 to strike the surface of the sealing portion 25 which will ultimately lead to a deterioration of the sealing portion 25 and/or the valve stem 18. Gate insert 31 provides a component that can be replaced as the sealing portion 25 wears rather than replacing the entire cavity insert or plate if the sealing portion 25 and the recess 11 for receiving nozzle assembly 10 were formed directly therein, as may still be done with smaller number of cavities. However, gate insert 31 still is a fairly detailed component and it is undesirable to replace it unless absolutely necessary.

At the end of the injection cycle, the valve stem 18 is moved into its closed position as previously described and the molding inserts, including core 30, are held in a closed position for a predetermined cycle time to allow the molten material to cool and solidify, thereby forming the molded article. Once the molded article has been allowed to cool to a sufficient level, the core 30 with the molded article thereon is moved away form the gate insert 31 and the vestige 26 is pulled away from the face portion 21 of the valve stem 18. If enough wear exists between the valve stem 18 and the sealing portion 25, a small amount of molten material will have migrated therein, and consequently as the vestige 26 is moved away form the vestige forming portion 25 a peeled edge 38 will form on the vestige 26 of the molded article 27.

Also, since the valve stem 18 is surrounded by molten material, it becomes quite hot. When the gate is closed by the valve stem 18, the hot tip of the valve stem 18 cools slower than the gate insert 31 as the mold cavity 28 is cooled.

Ideally, molded article 27 is not removed from the mold until the vestige 26 has cooled sufficiently to allow a clean separation of the solidified material at the face portion 21 of the valve stem 18. With the valve stem being hot compared to the gate insert, this can require increased cycle times to permit the necessary cooling and/or can result in undesirable characteristics in the molded article 27. Specifically, as the material in the mold cavity 28 adjacent the valve stem 18 is cooled relatively slowly due to the hot valve stem 18, parts molded from thermally sensitive materials, such as PET, can suffer from an enlarged area of crystallinity 40 or other undesired characteristics. To reduce cycle times, a mold may be opened before the material adjacent the face portion 21 has sufficiently solidified. Since the entire top surface of the vestige 26 is in contact with the face portion 21 of the hot valve stem 18, stringing and an uneven edge may form when the mold is opened.

Therefore, there is a need for an improved valve gate system that reduces or obviates some or all of the drawbacks of the prior art.

SUMMARY OF THE INVENTION

The present invention improves an injection molding apparatus having a mold with a mold cavity, an injection nozzle for communicating a molten material to the mold cavity, the nozzle has a moveable valve stem to selectively start and stop the communication of the molten material through the nozzle. The improved apparatus comprises a replaceable insert installed adjacent the mold cavity, the replaceable insert has a bore that connects a melt channel of the injection nozzle with the mold cavity, the bore has a sealing portion adjacent the mold cavity for receiving an end portion of the valve stem to stop the communication of molten material to the mold cavity. Preferably, a portion of the mold cavity is defined by a gate insert, and that the replaceable insert is installed therein. Furthermore, the mold cavity may include a vestige forming portion 35 that is located in the gate insert adjacent the sealing portion of the replaceable insert. Preferably, the sealing portion of the bore has a diameter smaller than that of the vestige forming portion 35.

The bore preferably has first portion and a second portion, the second portion being the sealing portion.

In one embodiment the first portion has a substantial clearance with the valve stem to allow backflow of molten material along the valve stem as the end portion of the valve stem is received in the bore.

In another embodiment, the first portion is an alignment portion having a close fit with the valve stem which aligns the end portion of the valve stem with the sealing portion so that the end portion is centered in the sealing portion. The sealing portion may have a smaller diameter and the alignment portion, which prevents wear on the sealing portion and the end portion of the valve stem received in it. The valve stem preferably has a feature which permits backflow of molten material along the valve stem as the end portion of the valve stem is received in the bore. In one embodiment, the feature is at least one elongated slot on an outside surface of the valve stem. In another embodiment, the feature is a reduced diameter portion of the valve stem adjacent the end portion.

In yet another embodiment of the present invention, the replaceable insert is made of a material having a low thermal conductivity, such as titanium or ceramic. Such construction negates the need for insulator between the nozzle tip and the replaceable insert.

DETAILED DESCRIPTION OF THE PREFERRED EMBODIMENTS

Figure 1:
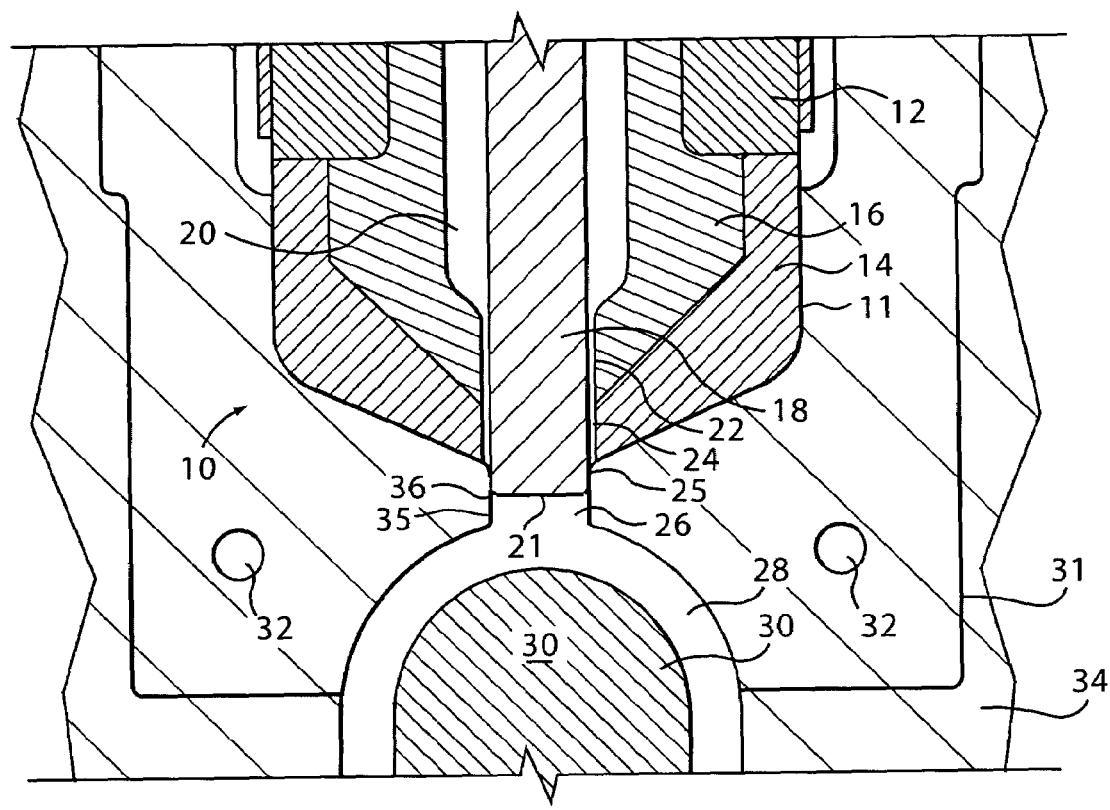
FIG. 1 is a simplified cross-sectional view of an injection molding nozzle and gate insert in accordance with the prior art.
Figure 2:
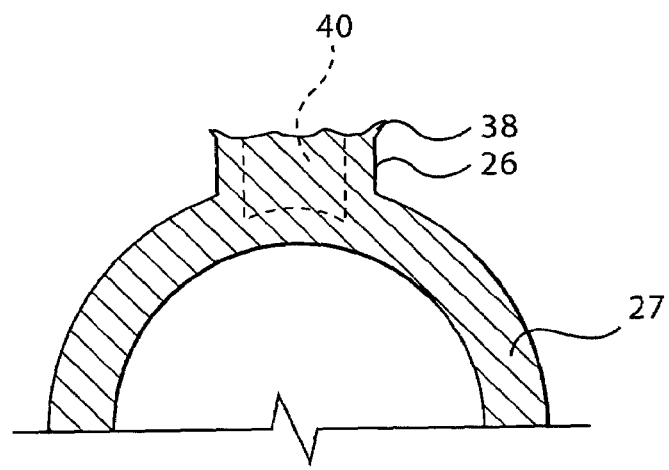
FIG. 2 is a partial cross-sectional view of a molded article in accordance with the prior art.
Figure 3:
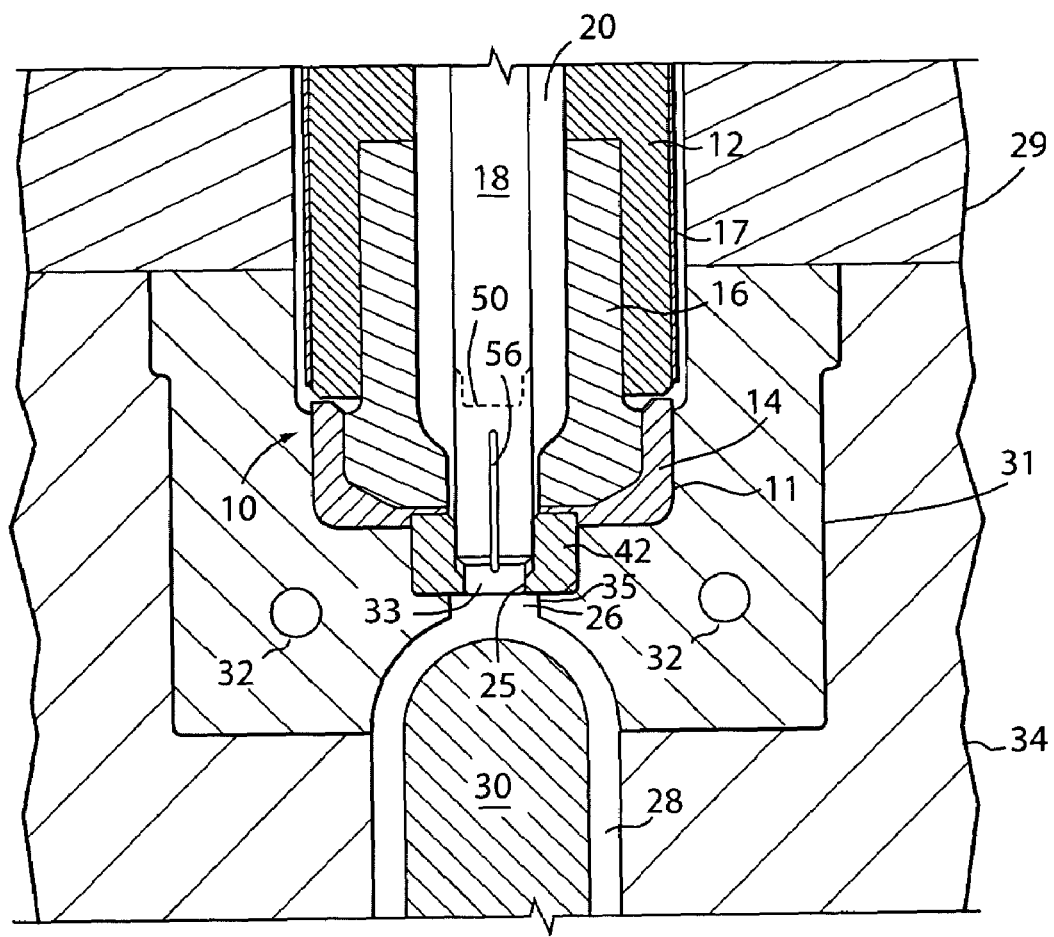
FIG. 3 is a simplified cross-sectional view of an embodiment of the present invention.

Referring now to FIG. 3, illustrating the best mode of the present invention, an injection molding nozzle assembly 10 in accordance with the present invention is shown installed in an injection mold. Accordingly, the nozzle assembly 10 extends through a hot runner manifold plate 29 and is seated within a recess 11 of a gate insert 31. The gate insert 31 is located within a cavity insert 34. In operation, a mold cavity 28 is formed between the respective molding inserts of a first half of the mold, including the gate insert 31 and cavity insert 34, engaged with those of a complementary second mold half, including a core insert 30. Thereafter, a flow of molten material is provided though the nozzle assembly 10 to the mold cavity 28 for the formation of a molded article therein. Cooling passageways 32 are provided in cavity insert 34 and gate insert 31 for the communication of a cooling fluid to remove heat from the cavity insert and gate insert to cool and solidify the molten material in the mold cavity 28.

The nozzle assembly 10, as well known in the art, is comprised of an elongated nozzle body 12 with a nozzle tip 16 affixed to a proximal end of the nozzle body. In a preferred embodiment, the nozzle tip 16 is threaded to the nozzle body 12, but any such suitable means could be used. Typically, a heater 17 is installed on the outside of nozzle assembly 10 to maintain the molten material in a molten state. In the preferred embodiment an optional insulator 14 is located between the nozzle tip 16 and the cooled gate insert 31 to reduce the transfer of heat from the hot nozzle tip 16 to the cooled gate insert 31. Located co-axially in the nozzle assembly 10 is a movable valve stem 18 that extends adjacent a vestige forming portion 35 of the mold cavity 28. In a preferred embodiment, the valve stem 18 is a slender elongated cylindrical piece that is moved up and down to an open and closed position respectively. When the valve stem 18 is in the open position as shown by phantom line 50, the molten material in melt channel 20 is allowed to enter the mold cavity 28. When placed in the closed position, as shown in FIG. 3, the end portion 33 of valve stem 18 is received in a sealing portion 25 of gate insert 31 thereby stopping the flow of material to the mold cavity 28.

Sealing portion 25 is preferably located in a replaceable insert 42 that is installed in the gate insert 31 in alignment with the valve stem 18. The replaceable insert 42 can easily be replaced when leakage around the end portion 33 of valve stem 18 becomes excessive. It is, therefore, not necessary to replace the entire gate insert 31 as is done with prior art molds. Preferably, the sealing portion 25 has a smaller diameter than vestige forming portion 35, which allows for easy removal of replaceable insert 42 using a tool inserted through mold cavity 28.

Figure 4:
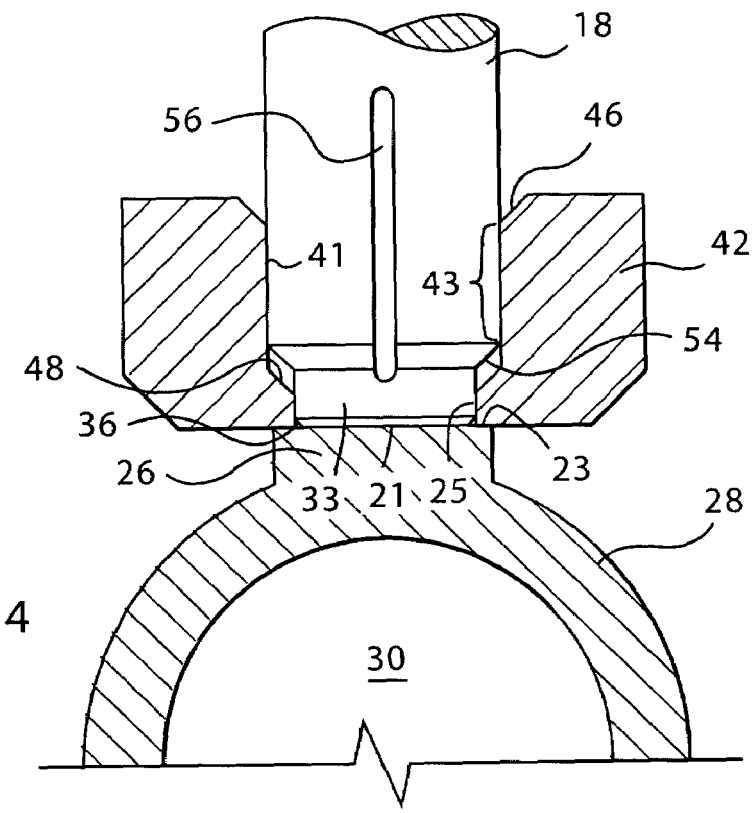
FIG. 4 is a detailed view of a portion of the view of FIG. 3.

Referring also to FIG. 4, the replaceable insert 42 also provides for more rapid cooling of an outer circumferential portion 23 of the vestige 26. Since the replaceable insert 42 is installed in the cooled gate insert 31, the circumferential portion 23 of vestige 26 adjacent the replaceable insert 42 will cool faster than the remainder of vestige 26 since the remainder is in contact with a face portion 21 of the valve stem 18, which is hotter than replaceable insert 42. This differential cooling will allow circumferential portion 23 to solidify before the remainder of vestige 26. Therefore, when core 30 is retracted to remove the molded article from the mold cavity 28, this earlier-solidified circumferential portion 23 will tend to break away more cleanly than if it had been cooled at the same rate as the remainder of vestige 26.

Figure 5:
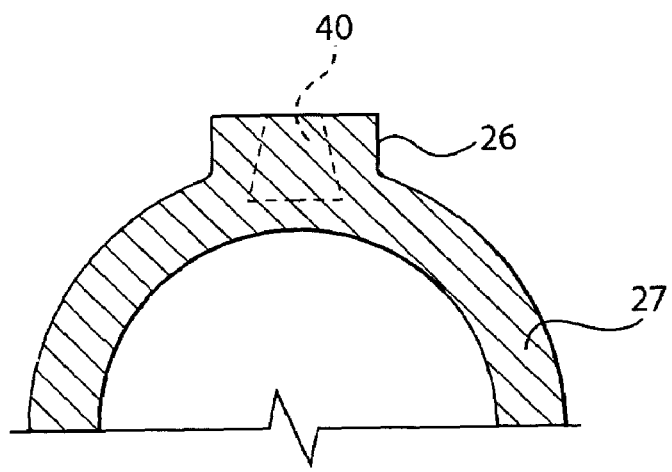
FIG. 5 is a partial cross-sectional view of a molded article in accordance with the present invention.

As shown in FIG. 5, this clean break will result in a more uniform and flat vestige 26 than with prior art molds. In addition, the area of crystallinity 40 formed inside the molded article 27 is reduced due to the improved cooling of the vestige 26. Furthermore, due to the location of the sealing portion 25 being radially offset from the outer surface of the finished vestige 26, any material weeping past seal portion 25 and solidifying is not likely to cause a tear extending to the surface of the vestige 26 when the mold is opened.

Referring again to FIGS. 3 and 4, the replaceable insert 42 has a bore 41 which receives valve stem 18. The bore 41 has a first portion and a second portion. The first portion is preferably an alignment portion 43 and the second portion is the sealing portion 25. Preferably, the sealing portion 25 has a diameter smaller than the diameter of the alignment portion 43, and the end portion 33 of valve stem 18, which is received in sealing portion 25, has a smaller diameter than alignment portion 43. This arrangement prevents end portion 33 from bumping chamfer 46 as valve stem 18 enters replaceable insert 42. Valve stem 18 preferably has a chamfer 54 above end portion 33 that interacts with chamfer 46 to help guide the valve stem 18 when it first enters the bore 41. Alignment portion 43 preferably has a close fit with valve stem 18 so that end portion 33 is received in sealing portion 25 centered and without contact. A second chamfer 48 may be provided on the replaceable insert 42 to interact with chamfer 36 on end portion 33 to help guide valve stem 18 into the sealing portion 25 if the fit between the valve stem 18 and alignment portion 43 becomes loose. These chamfers act to reduce wear on both the valve stem 18 and the replaceable insert 42 and prolong the useable life of both components.

Therefore, until substantial wear occurs between the valve stem 18 and the bore 41, there will be little wear between the end portion 33 and sealing portion 25, thereby facilitating formation of good vestiges on molded parts. Separating the alignment function and the sealing function on the valve stem 18 and replaceable insert 42 into two different portions substantially increases the life of the end portion 33 and sealing portion 25.

At least one elongated recess 56 is preferably formed in the surface of the valve stem 18. The elongated recess is preferably aligned with the valve stem 18. The elongated recess 56 functions to allow passage of molten material that would have otherwise have been trapped between the valve stem 18 and the alignment portion 43 to flow back along the elongate recess 56 and into the melt channel 20 as the valve stem is brought to the closed position and end portion 33 engages seal portion 25.

Figure 6:
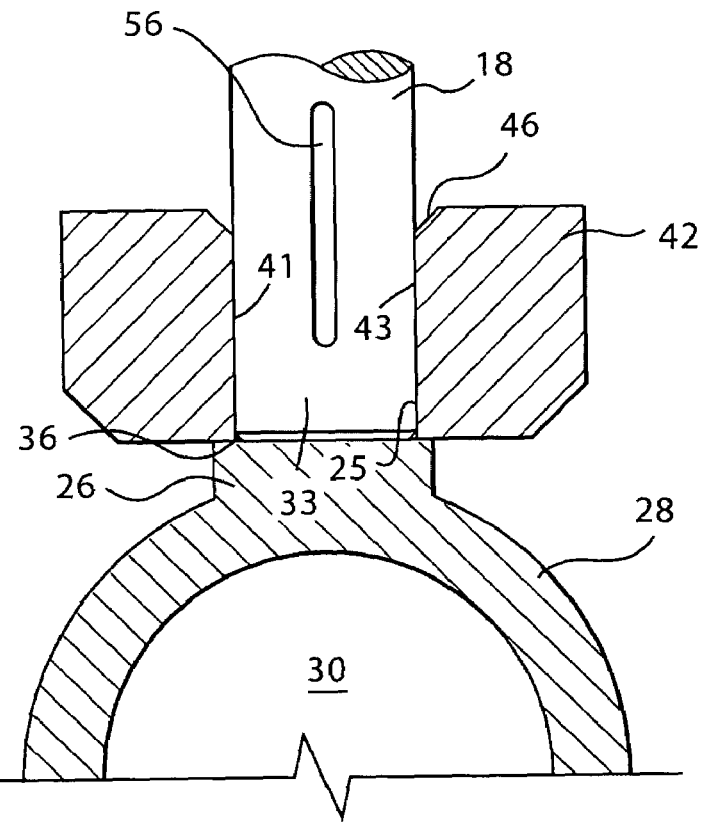
FIG. 6 is the view of FIG. 4 illustrating another embodiment of the present invention.

Referring to FIG. 6, in another embodiment of the present invention bore 41 has a uniform diameter that receives valve stem 18 in a close fit. The valve stem 18 also preferably has a uniform diameter where it interfaces with bore 41. Chamfers 46 and 36 help guide valve stem 18 into bore 41. The recess 56 again allows the molten material to flow up out of bore 41 as the valve stem 18 is brought to a closed position. This embodiment is simpler to manufacture than the embodiment shown in FIGS. 3 and 4, however with the sealing function and alignment function occurring along the same portion of the replaceable insert 42, wear of the end 33 of valve stem 18 may occur faster than with the previous embodiment. That is counteracted by the longer length of bore 41. Even if material weeps past end 33 and solidifies, for reasons discussed above it is not likely to cause a tear extending to the surface of the vestige 26 when the mold is opened.

Because replaceable insert 42 is easily removed from the gate insert 31, it can cost-effectively be readily replaced along with the valve stem 18 when wear becomes excessive.

Figure 7:
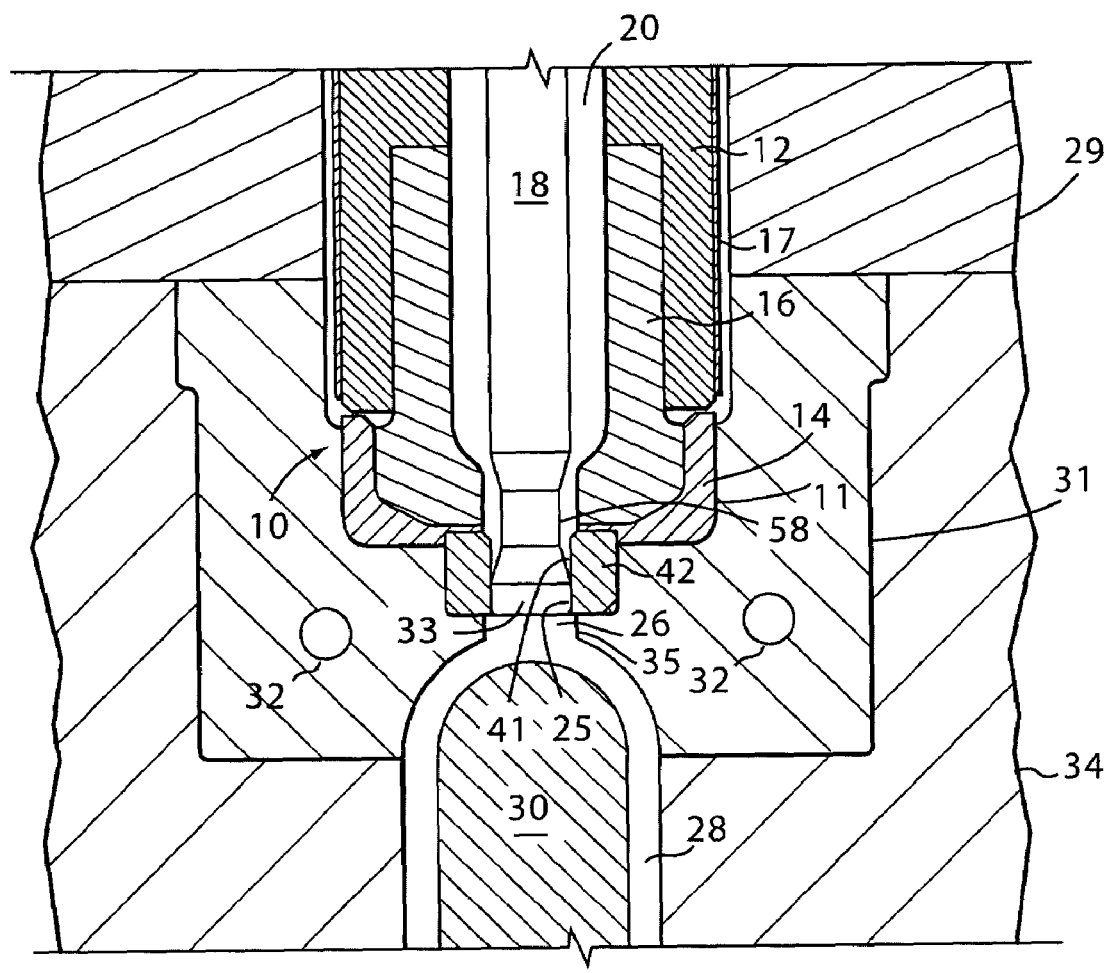
FIG. 7 is the view of FIG. 3 illustrating yet another embodiment of the present invention.

Referring to FIG. 7, in another embodiment of the present invention, replaceable insert 42 is identical to that of the embodiment shown in FIG. 6. Rather than an elongated recess, valve stem 18 has a reduced diameter portion 58 adjacent end portion 33 that allows backflow of the molten material out of bore 41 as the valve stem 18 is brought to a closed position.

Figure 8:
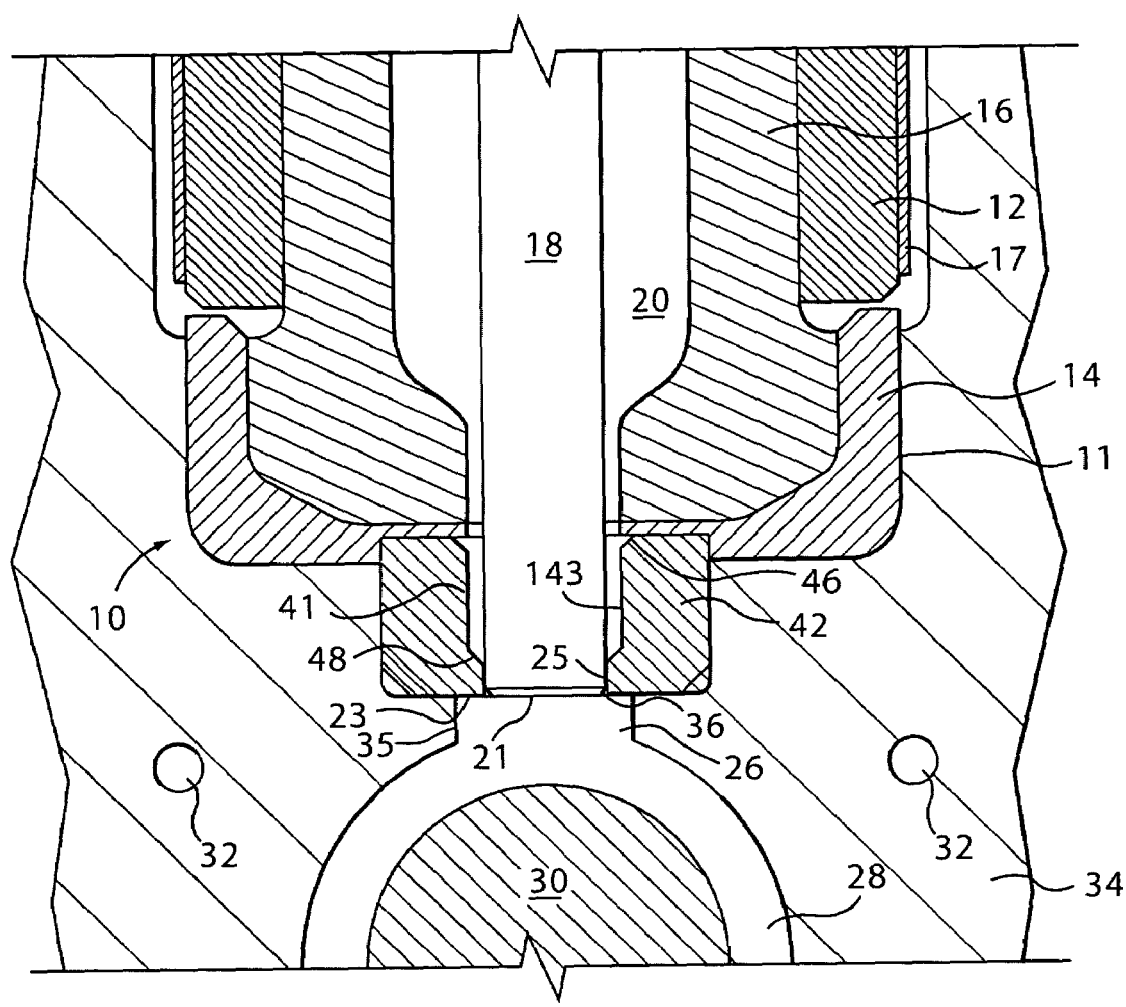
FIG. 8 is a simplified cross-sectional view of another embodiment of the present invention.

Referring to FIG. 8, another embodiment of the present invention uses a conventional valve stem that is a straight cylinder with only a small chamfer 36 at its end. With no additional feature on valve stem 18 to aid the backflow of molten material as the valve stem is brought to a closed position, first portion 143 of bore 41 in replaceable insert 42 is a larger diameter allowing greater clearance between valve stem 18 and bore 41, which provides for backflow of molten material. Sealing portion 25 has a reduced diameter providing a close fit with valve stem 18. Chamfer 46 guides the valve stem 18 into replaceable insert 42, and chamfer 48 guides it into sealing portion 25. This embodiment has the advantage of the simplest configuration of valve stem 18 with a replaceable insert 42 that is readily replaced when wear becomes excessive.

In all of the above embodiments, nozzle assembly 10 contacts the gate insert 31 through an insulator 14 which restricts heat transfer from hot nozzle tip 16 to cold gate insert 31. Insulator 14 also helps align nozzle assembly 10 in gate insert 31. However, molten material can be forced between the insulator and nozzle tip thereby displacing the insulator and affecting alignment of the nozzle assembly 10 with gate insert 31.

Figure 9:
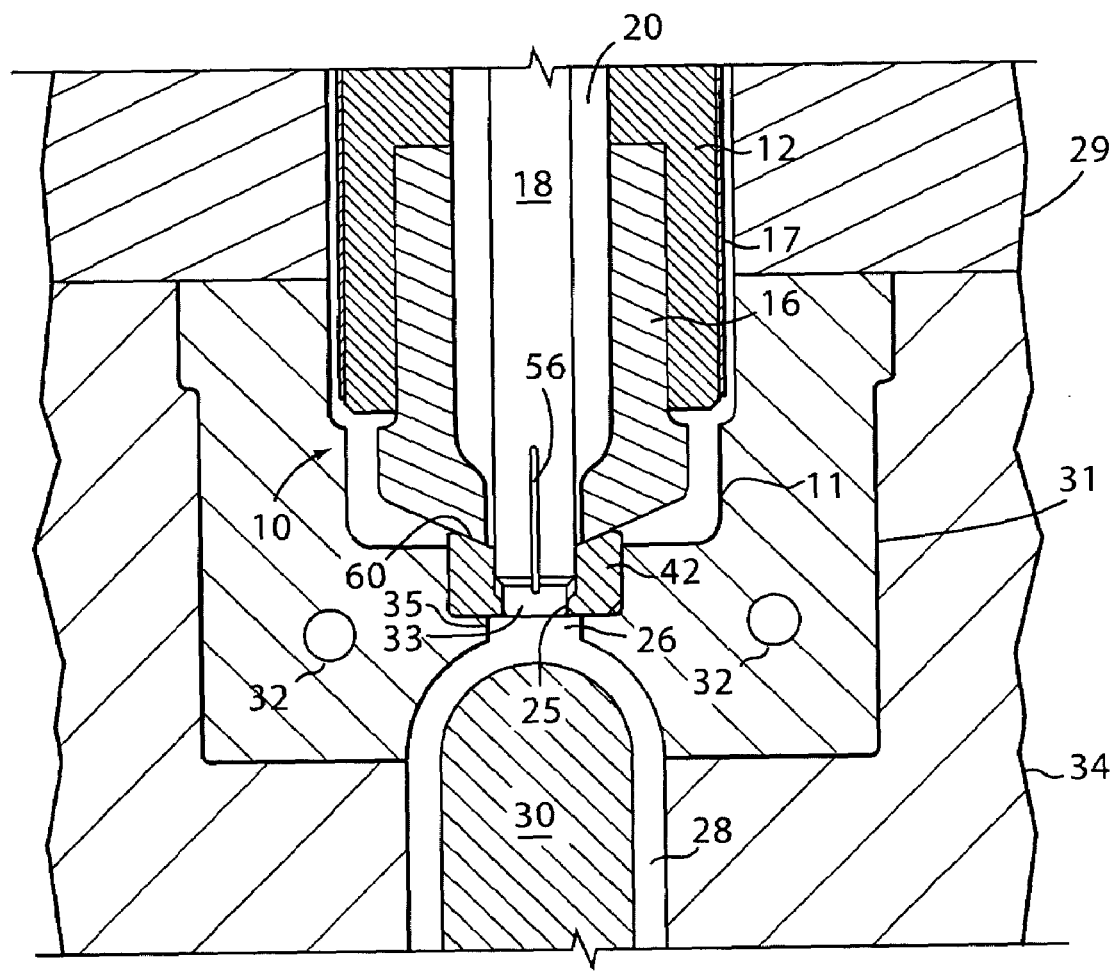
FIG. 9 is the view of FIG. 3 illustrating yet another embodiment of the present invention.

Referring to FIG. 9, another embodiment of the present invention eliminates the need for an insulator between the nozzle tip 16 and the gate insert 31. In this embodiment, replaceable insert 42 is made of a material having low thermal conductivity, such as titanium or ceramic, to reduce heat transfer between the nozzle tip 16 and gate insert 31. Nozzle tip 16 seats directly against the upper surface 60 of the replaceable insert 42. The upper surface 60 preferably has a conical shape over at least a center portion and receives the conical end of nozzle tip 16 to aid in aligning the nozzle tip in gate insert 31.

Figure 10:
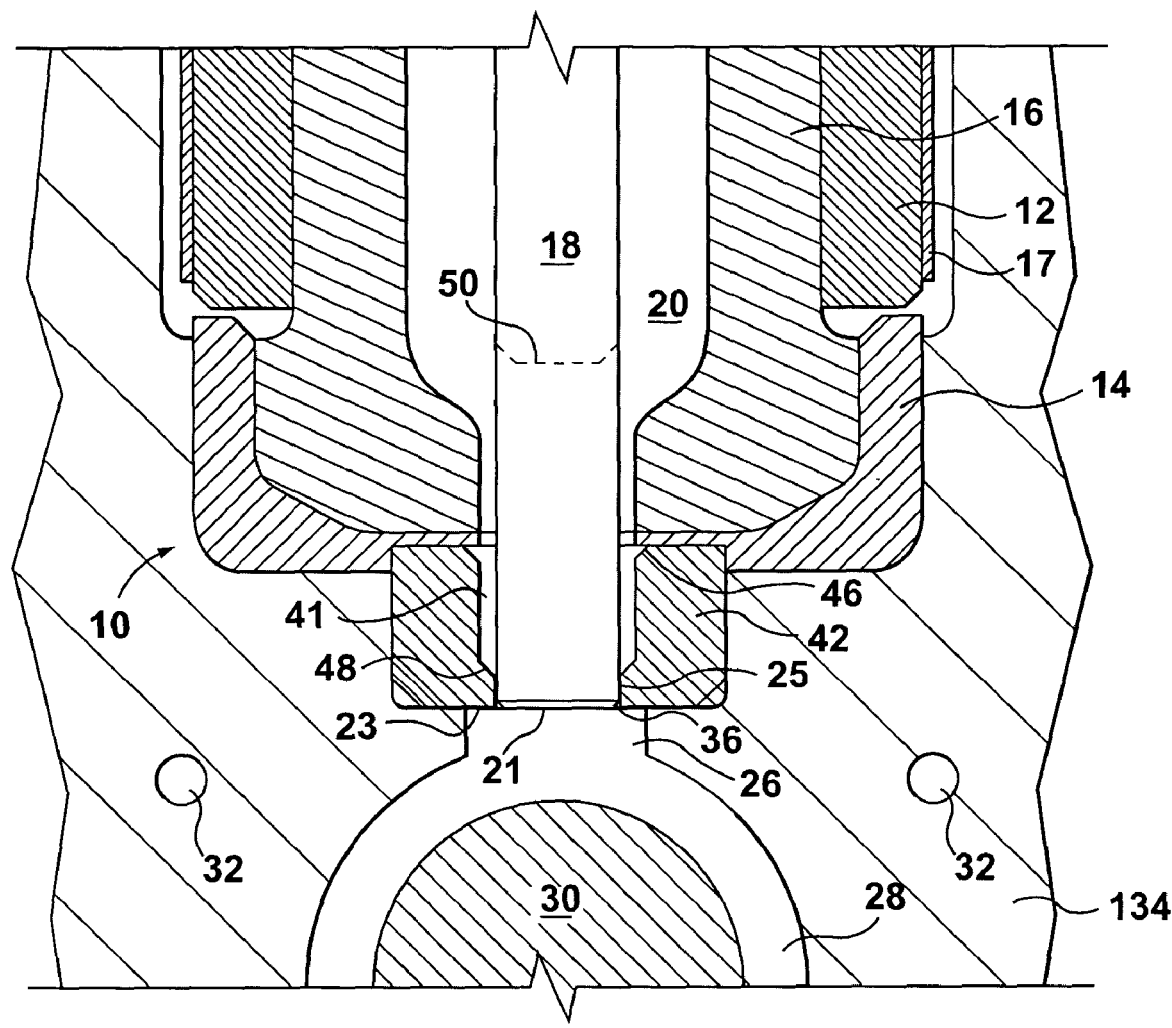
FIG. 10 is a simplified cross-sectional view of another embodiment of the present invention.

Referring to FIG. 10, another embodiment of the present invention is shown wherein the replaceable insert 42 is located in a cavity plate 134. That is, the embodiment is similar to that of FIG. 3 except that the gate structure is formed directly into the cavity plate.

The present invention provides an improved gate insert with a replaceable insert and a valve stem for an injection molding apparatus giving longer wear and easily replaceable components when wear becomes excessive.

It will, of course, be understood that the above description has been given by way of example only and that modifications in detail may be made within the scope of the present invention as defined by the following claims. For example, the nozzle assembly recess and seat for the replaceable insert could be formed directly into the cavity insert.

What is claimed is:

1. An injection molding apparatus having a mold with a cavity plate including a mold cavity with a gate and a vestige adjacent the gate, an injection nozzle for communicating a flowable material to the mold cavity, the nozzle having a moveable valve stem to selectively start and stop the communication of the flowable material through the nozzle and the gate, the improved apparatus comprising:
    a replaceable insert installed in the cavity plate adjacent the vestige, the replaceable insert containing the gate having a passageway and a sealing portion that receive an end portion of the valve stem to stop the communication of the flowable material through the gate, the sealing portion being adjacent the vestige and having a diameter smaller than that of a top surface of the vestige immediately adjacent the sealing portion.

2. The apparatus of claim 1, wherein the passageway has a substantial clearance with the valve stem to allow backflow of the flowable material along the valve stem as the end portion of the valve stem is received in the passageway.

3. The apparatus of claim 1, wherein the passageway has a close fit with the valve stem and wherein the valve stem has a feature which permits backflow of the flowable material along the valve stem as the end portion of the valve stem is received in the passageway.

4. The apparatus of claim 3, wherein the feature is at least one elongated slot on an outside surface of the valve stem.

5. The apparatus of claim 3, wherein the sealing portion has a smaller diameter than that of the passageway.

6. An injection molding apparatus having a mold with a cavity plate including a mold cavity with a gate and a vestige adjacent the gate, an injection nozzle for communicating a flowable material to the mold cavity, the nozzle having a moveable valve stem to selectively start and stop the communication of said flowable material through the nozzle and the gate, the improved apparatus comprising:
    a replaceable insert installed in the cavity plate adjacent the vestige, the replaceable insert containing the gate having a passageway and a sealing portion that receive an end portion of the valve stem to stop the communication of flowable material through the gate, the passageway having a close fit with the valve stem, the valve stem having a feature which permits backflow of flowable material along the valve stem as the end portion of the valve stem is received in the passageway, the sealing portion being adjacent the vestige and having a diameter smaller than that of a top surface of the vestige, the sealing portion having a diameter smaller than that of the passageway.

7. A gate insert in a cavity plate of a mold for injection molding, comprising:
    a body configured to be installed in the cavity plate adjacent a vestige of a cavity in the cavity plate, the body having a passageway and a sealing portion for receiving an end portion of a valve stem of an injection molding nozzle to stop flow of material through the gate insert during an injection molding process, the sealing portion being adjacent the vestige and having a diameter smaller than the diameter of a top surface of the vestige immediately adjacent the sealing portion.

8. A replaceable insert for an injection molding apparatus having a mold with a mold cavity defined therein, the mold cavity having a vestige forming portion, an injection nozzle defining a melt channel for communicating a molten material to said mold cavity, the nozzle having a moveable valve stem to selectively start and stop the communication of said molten material through the melt channel, the replaceable insert comprising:
    a body that is configured to be received in the mold adjacent the vestige forming portion, a bore configured in the body for connecting the melt channel of the injection nozzle with the mold cavity, the bore having a sealing portion adjacent the mold cavity for receiving an end portion of the valve stem to stop the communication of molten material to the mold cavity, and the sealing portion of a top surface of the bore having a diameter that is smaller than that of the vestige forming portion.

9. The replaceable insert of claim 8, wherein the molding apparatus further includes a gate insert that partially defines a portion of the mold cavity, the replaceable insert configured to be arranged in the gate insert.

10. The replaceable insert of claim 8, wherein the bore has a first portion and a second portion, the second portion being the sealing portion.

11. The replaceable insert of claim 10, wherein the first portion has a substantial clearance with the valve stem to allow backflow of molten material along the valve stem as the end portion of the valve stem is received in the bore.

12. The replaceable insert of claim 10, wherein the first portion is an alignment portion having a close fit with the valve stem.

13. The replaceable insert of claim 12, wherein the end portion of the valve stem aligns with the sealing portion so that the end portion is centered in the sealing portion by the fit between the alignment portion and the valve stem.

14. The replaceable insert of claim 14, wherein the sealing portion has a smaller diameter than the alignment portion.

15. The replaceable insert of claim 8, wherein the valve stem has a backflow feature which permits backflow of the molten material along the valve stem as the end portion of the valve stem is received in the bore.

16. The replaceable insert of claim 15, wherein the backflow feature is at least one elongated slot on an outside surface of the valve stem.

17. The replaceable insert of claim 15, wherein the backflow feature is a reduced diameter portion of the valve stem adjacent the end portion.

18. The replaceable insert of claim 8, wherein the replaceable insert is made of a material having a low thermal conductivity.

19. The replaceable insert of claim 18, wherein the material as titanium.

20. The replaceable insert of claim 18, wherein the material is ceramic.

21. The replaceable insert of claim 8, further comprising a cavity insert that partially defines a portion of the mold cavity, the replaceable insert being located in the cavity insert.

22. An injection molding apparatus having a mold with a mold cavity defined therein, and a gate insert defining a portion of the mold cavity including a vestige forming portion, an injection nozzle for communicating a molten material to said mold cavity, the nozzle having a moveable valve stem to selectively start and stop the communication of the molten material through the nozzle and the gate insert, the improved apparatus comprising:

a replaceable insert installed in the gate insert adjacent the vestige forming portion, the replaceable insert having a bore that receives an end portion of the valve stem to stop the communication of molten material through the gate insert, the bore having a sealing portion adjacent the vestige forming portion and an alignment portion having a close fit with the valve stem to center the end portion of the valve stem in the sealing portion, the sealing portion of the bore having a diameter smaller than that of a top surface of the vestige forming portion and smaller than that of the alignment portion, the valve stem having a feature which permits backflow of molten material along the valve stem as the end portion of the valve stem is received in the bore.

23. A gate insert and a replaceable insert for an injection mold, the gate insert defining a portion of a mold cavity, the replaceable insert located in the gate insert adjacent the mold cavity, the replaceable insert comprising:

a body having a bore with a sealing portion for receiving a valve stem to stop flow of molten material through the bore, the replaceable insert being removable from the gate inert, the portion of the mold cavity defined by the gate insert has a vestige forming portion adjacent the sealing portion of the replaceable insert, the vestige forming portion having a diameter, the sealing portion having a diameter smaller than that of a top surface of the vestige forming portion.

* * * * *